UNITED STATES PATENT OFFICE.

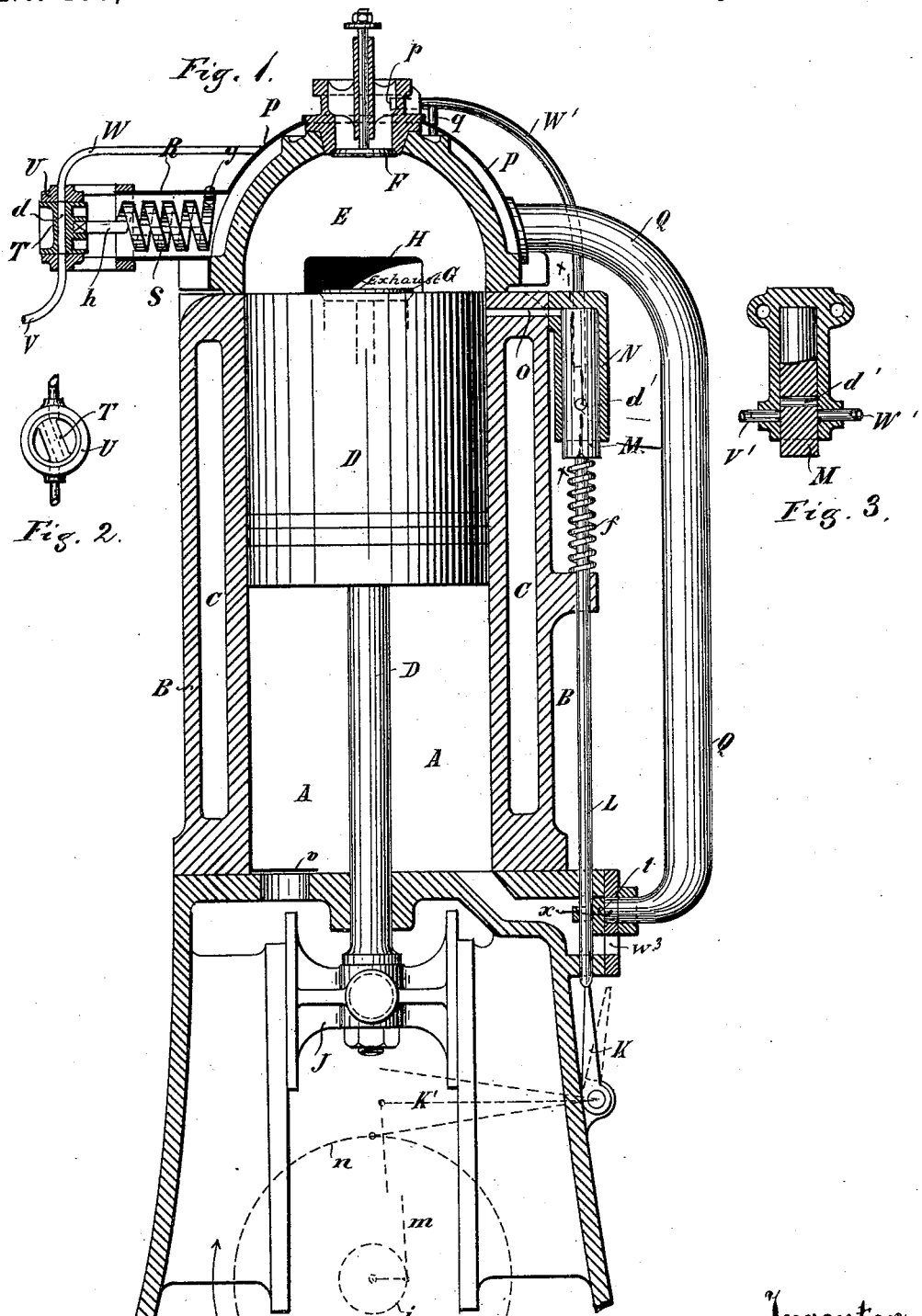

EMIL CAPITAINE, OF BERLIN, GERMANY.

GAS-MOTOR.

SPECIFICATION forming part of Letters Patent No. 406,160, dated July 2, 1889.

Application filed November 14, 1888. Serial No. 290,790. (No model.) Patented in Germany August 15, 1888, No. 45,129.

*To all whom it may concern:*

Be it known that I, EMIL CAPITAINE, a subject of the German Emperor, residing at Berlin, in the Kingdom of Prussia and German Empire, have invented certain new and useful Improvements in Gas-Motors, of which the following is a specification, and for which I have received Patent No. 45,129, dated August 15, 1888, in Germany.

This invention relates to improvements in that class of gas-engines in which the explosion-chamber is not cooled from the outside, for instance, by means of water circulating through suitable channels or jackets; and the object of my invention is to provide a gas-engine in which the walls of the explosion-chamber can be maintained at a fixed temperature.

The invention consists in the construction and combination of parts and details, as will be fully described and set forth hereinafter, and finally pointed out in the claims.

In the accompanying drawings, Figure 1 is a vertical longitudinal sectional view of my improved gas-engine. Fig. 2 is an end view of the valve controlled by the thermostat. Fig. 3 is an enlarged vertical sectional view on the line $x$ $x$, Fig. 1.

Similar letters of reference indicate corresponding parts.

The cylinder A is provided with the usual water-jacket or cold-water channels C and contains the piston D, connected with the piston-rod D', having the cross-head J guided in the usual manner. The lower end of the cylinder is closed and the upper end is open and covered by a hemispherical explosion-chamber E, provided with the outlet-channel H, which is controlled by the valve G. The explosion-chamber E is surrounded by a jacket P, from which the tube R projects, that contains the thermostat S, composed of two strips of different kinds of metal soldered together and bent to form a spiral, one end $g$ of said thermostat being secured to the walls of the tube R, and the other end being secured to the stem $h$ of the valve T, mounted to oscillate on its center within a cylindrical casing U, connected with pipes V and W at diametrically-opposite points. The valve T is provided with a transverse channel $d$, that can, when the valve is in the proper position, establish communication between the ends of the pipes V and W. A pipe Q extends from the jacket P to the bottom of the cylinder and is contracted at its lower end $x$, said contracted end $x$ of the pipe Q being secured in the end plate of the channel X, communicating with the bottom of the cylinder. Below the end $x$ of the pipe Q the end plate of said channel is provided with an aperture $W^3$, which can be closed by a slide-valve $l$; also serving to close the end $x$ of the pipe Q, said valve $l$ being secured to the lower end of a vertically-sliding rod L, suitably guided. At its upper end it supports a piston M, provided with a transverse aperture $d'$ and working in a cylinder N, the upper end of which is brought in communication with the upper ends of the cylinder A by the channel O.

The pipe V' is connected with the cylinder N, and diametrically opposite the same the pipe W' is connected with the cylinder N, said pipe W' extending upward to the bushing $p$ in the top of the explosion-chamber E. A pipe $q$ connects the upper end of the pipe W' with the space between the jacket P and the exterior of the explosion-chamber. A spring $f$, surrounding the rod L, presses the piston M upward and into the cylinder N.

One arm K of an angle-lever is arranged at the lower end of the rod L, and the other arm K' of said angle-lever (shown in dotted lines) is connected by the rod $m$ (in dotted lines) with an eccentric $i$.

$n$ represents the path traveled by the crank of the crank-shaft. $v$ is an upwardly open inlet-valve in the bottom of the cylinder.

The operation is as follows: When the piston D rises, it draws air into the bottom part of the cylinder A through the port closed by the valve $v$ and through the aperture $W^3$. When the piston descends, the greater part of the air that has been drawn into the cylinder is expelled through the aperture $W^3$; but a certain part of this air passes through the pipe Q, the lower end of said pipe being open, into the space between the jacket P and the outside of the combustion-chamber, and passes out of said space through the pipe R. By coming in contact with the outer surface of the explosion-chamber the air that passes through the space between the outer surface of the explosion-chamber and the jacket P becomes heated more or less, according to the degree of heat that the said explosion-chamber has at the time. The spiral band S, under the action of the heated air passing through and around it, turns the shaft $h$ on its longitudinal axis, thereby turning the valve T so as to bring its channel $d$ in line with the pipes V and W, thus permitting the water to pass from the water-supply tank through the pipe V and channel $d$ into the pipe W, and from the same into or upon the explosion-chamber. The spiral band S is so adjusted that it turns or moves the valve T in the manner described at a temperature of about 300° Celsius. As the walls of the explosion-chamber are cooled, it is evident that the temperature of the air passing through the space between the jacket P and the walls of the explosion-chamber will be reduced, and this cooler air, acting on the spiral band S, causes the same to turn the valve T such a distance as to interrupt the connection between the pipes V and W. The spring $f$ is of such power that it can resist the ordinary pressure to which the gases are compressed in the cylinder; but if the pressure in the cylinder is still increased the spring F can no longer prevent a downward movement of the piston M. The greatest pressure is reached when the piston D is in the position shown in Fig. 1, and when the piston is in this position the explosion takes place. When the piston D is in this position, the arm K of an angle-lever has passed under the lower end of the rod L, as shown in Fig. 1, thus preventing the pistion M from descending, even if the pressure exerted on the same should be able to overcome the resistance of the spring $f$. In case the combustion-chamber becomes too hot the mixture of gas and air will be ignited during the compression—that is, before the piston has arrived at its highest position—and in consequence there is a loss of power. When this takes place, however, the arm K of the angle-lever is not yet under the rod L, and the pressure caused by the explosion can force down the piston M sufficiently to establish communication through the channel $d$ between the pipes V' and W', thus permitting water to pass into the jacketed space around the explosion-chamber or upon the valve F. The valve $l$ is also moved downward and closes the aperture W, thus permitting all the air to pass from the lower part of the cylinder A, through the channel X, into the lower end of the pipe Q, and into the jacketed space around the explosion-chamber. The water either passes from the pipe W into the bushing P and upon the spraying-valve F, so as to enter the combustion-chamber with the mixture of gas and air, or the water flows upon the outer surface of the combustion-chamber.

The lever K K' can be dispensed with by making the spring F so powerful that it will only permit the valve M to descend when the pressure in the cylinder N is extraordinarily great.

Having thus described my invention, I claim as new and desire to secure by Letters Patent—

1. In a gas-engine, the combination, with a cylinder and piston, of a combustion-chamber on the cylinder, a jacket surrounding said combustion-chamber, and pipes for conducting air into and out of the jacketed space, a thermostat in said air-outlet pipe, and a water-valve governed by said thermostat, substantially as set forth.

2. In a gas-engine, the combination, with a cylinder and piston, of an explosion-chamber on one end of the cylinder, tubes for conducting air into and out of said explosion-chamber, a thermostat in the outlet-tube, a valve mounted to rock on its center and connected with said thermostat, and two water-conducting pipes connected with the valve-casing at opposite points, substantially as set forth.

3. In a gas-engine, the combination, with a cylinder and piston, of a combustion-chamber, a jacket surrounding said combustion-chamber, a pipe for conducting air into said jacket, a valve controlling said pipe, a rod on which said valve is secured, a piston on the upper end of said rod, and a cylinder in which the piston works, said cylinder being connected with the upper part of the main cylinder of the machine, substantially as set forth.

4. In a gas-engine, the combination, with a cylinder and piston, of a combustion-chamber, a jacket surrounding said combustion-chamber, a pipe for conducting air into said jacket, a valve controlling said pipe, a rod on which said valve is secured, a piston on the upper end of said rod, and a cylinder in which the piston works, said cylinder being connected with the upper part of the main cylinder of the machine, a water-supply pipe controlled by said piston, leading to the explosion-chamber, substantially as set forth.

5. In a gas-engine, the combination, with a cylinder and piston, of an explosion-chamber on said cylinder, a jacket surrounding the explosion-chamber, a pipe for conducting air into said jacket, a valve controlling said pipe, a rod on which said valve is secured, a piston on the upper end of said rod, a cylinder in which said piston works, said cylinder being connected with a channel in the upper part of the main cylinder, and a spring for pressing the piston of said additional cylinder upward, substantially as set forth.

6. In a gas-engine, the combination, with a cylinder and a piston, of an explosion-chamber on said cylinder, a jacket surrounding said explosion-chamber, a cylinder connected with the top of the main cylinder, a piston in said additional cylinder, a rod connected with said additional piston, an angle-lever having one arm below said rod, and an eccentric on the main shaft governing said angle-lever, and a water-supply pipe extending from the additional cylinder to the jacket of the explosion-chamber, substantially as set forth.

In testimony that I claim the foregoing as my invention I have signed my name in presence of two subscribing witnesses.

EMIL CAPITAINE.

Witnesses:
CARL BORNGRAEBER,
BERNH. POWSELMANN.